Leland S. Hetenhouser
INVENTOR.

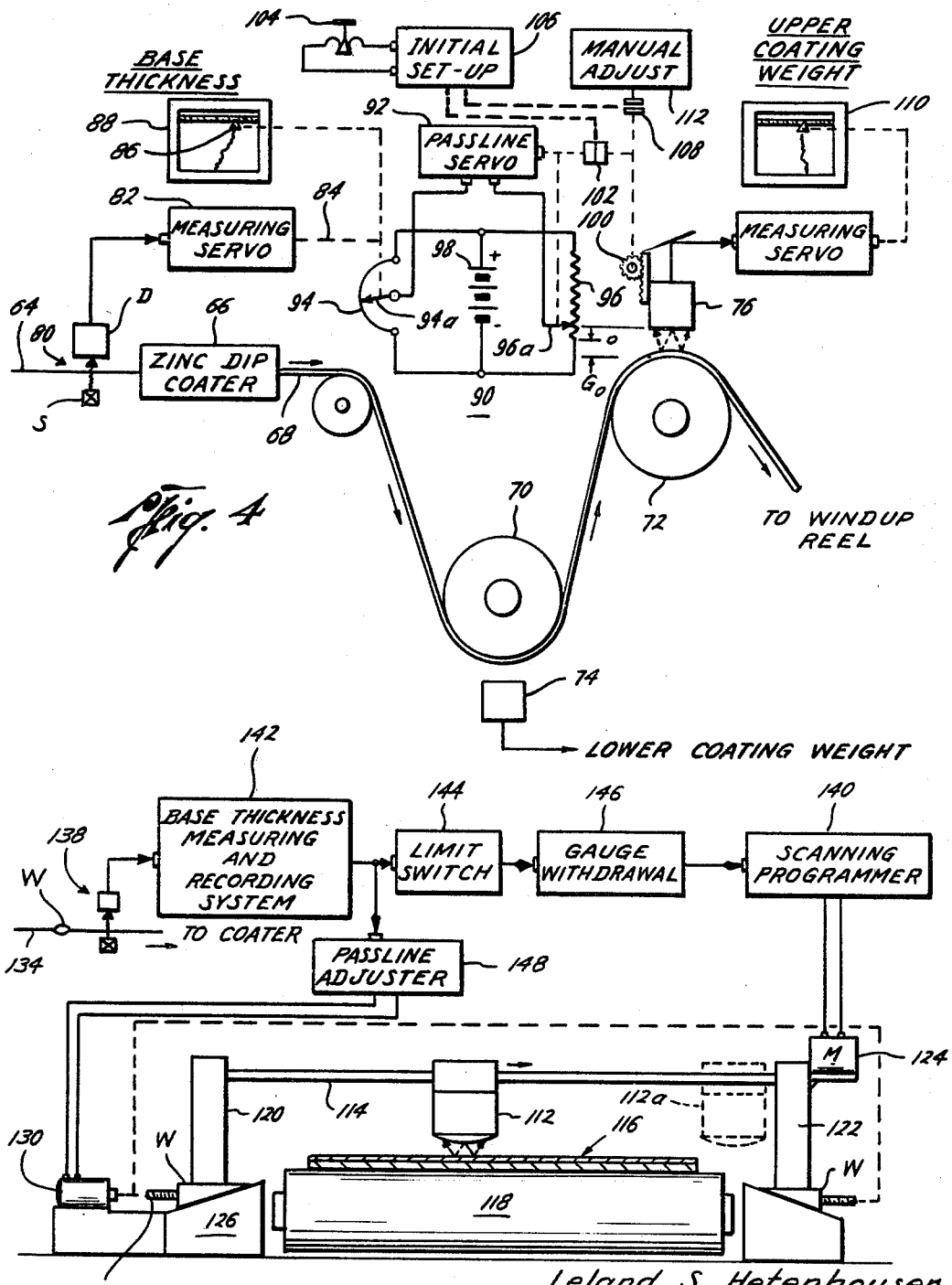

BY James J. O'Reilly
AGENT

United States Patent Office 3,499,152
Patented Mar. 3, 1970

3,499,152
METHOD AND APPARATUS FOR IMPROVING BACKSCATTER GAUGE RESPONSE
Leland S. Hetenhouser, Columbus, Ohio, assignor to Industrial Nucleonics Corporation, a corporation of Ohio
Filed Mar. 18, 1966, Ser. No. 535,497
Int. Cl. H01j *39/00, 37/00;* G01t *1/16*
U.S. Cl. 250—83.3                                                18 Claims

ABSTRACT OF THE DISCLOSURE

The air gap of a radiation backscatter gauge used to measure the weight of coating on a base material is maintained at an optimum value. A base material thickness gauge provides a signal for automatically adjusting the vertical position of the backscatter gauge when the base thickness changes. A comparison bridge circuit comprising a base material thickness slide wire and a potentiometer, mechanically coupled to the backscatter gauge, is used to provide a passline error signal. The backscatter gauge is also automatically withdrawn when a weld or other excessive thickness of base material is detected.

This invention relates generally to material thickness gauges, and, more particularly, to a novel method and means for compensating a radiation backscatter gauge for errors resulting from changes in the thickness of the material being measured.

BACKGROUND

In many industrial processes, a base material is coated on one or both sides with a coating material of different composition from the base material. The base material is very often a sheet material that is conveyed through a coater wherein the coating is applied to the surface of the sheet. In the metals and plastics industries a base sheet, may be conveyed through either a zinc dip or a plastic extrusion coater, depending on the industry. Usually, the base material has a nominal thickness and a coating of a certain desired weight per unit area is applied.

Systems are available to control coating weight per unit area; see, for example, U.S. Patent 2,895,888 issued to D. E. Varner and assigned to the same assignee as the present invention. This patent discloses the use of a radiation backscatter gauge for measuring the weight per unit area of the coating, which is proportional to the product of its thickness and its density. Hereinafter, this characteristic of the coating is referred to as its "weight." This type of weight transducer uses a radiation source and a detector on the same side of the sheet. The source directs radiation toward the coating and radiation reflected therefrom is detected by the detector.

It has been found that the detected radiation is a function not only of the coating weight but also of the gap, passline or spacing of the gauge from the surface of the sheet. A problem arises when the thickness of the base sheet changes. If base sheet thickness increases the detector signal will decrease due to the reduction in measuring gap. This signal decrease may be falsely interpreted as a change in coating weight which may be invariant. U.S. Patent 2,855,518 issued to M. J. Foley et al. discloses apparatus for mounting a backscatter gauge on a roller assembly adapted to ride on the coated sheet. The spacing between the gauge and the coated sheet is maintained so long as the roller assembly confines the coated sheet against the backup rolls and contact is maintained.

BRIEF DESCRIPTION OF THE PRESENT INVENTION

There is an optimum air gap where changes in detector signal due to passline changes are at a minimum and the sensitivity and accuracy of coating weight measurement are at a maximum.

I have invented a novel method and means for positioning the gauge relative to the coated surface to provide the optimum air gap regardless of changes in the thickness of the base material. In a preferred embodiment, I measure the thickness of the uncoated sheet and position the backscatter gauge toward or away from the coated sheet in accordance with the measured base thickness to maintain the optimum air gap. In a further preferred form of my invention, I provide a feedback signal continuously indicative of the position of the backscatter gauge and compare it with the thickness signal provided by second gauge located upstream of the coater to derive a position error signal. The backscatter gauge positioning system responds to this position error signal to move the gauge until the feedback signal cancels the base thickness signal. This insures that an optimum air gap is continuously maintained and the output signal of the backscatter gauge will not be influenced by changes in the thickness of the base material.

DESCRIPTION OF THE OBJECT

Accordingly, it is a primary object of the present invention to provide an improved radiation backscatter coating weight measuring system.

It is another object of the present invention to provide a radiation backscatter coating weight measuring system that is more accurate than similar devices used heretofore.

It is also an object of the present invention to provide an improved coating weight gauging system that does not require physical contact with the sheet.

It is yet another object of the present invention to provide a radiation backscatter coating weight gauge that is insensitive to the thickness of the base material on which coating is applied.

BRIEF DESCRIPTION OF THE FIGURES

FIG. 4 is a diagrammatic view, partly schematic, of an automatic passline adjuster for a line plating process comprising a preferred embodiment of the present invention; and, FIG. 5 is an end view, partly in section, of an alternative passline adjust embodiment of the present invention.

DESCRIPTION

Figure 1:
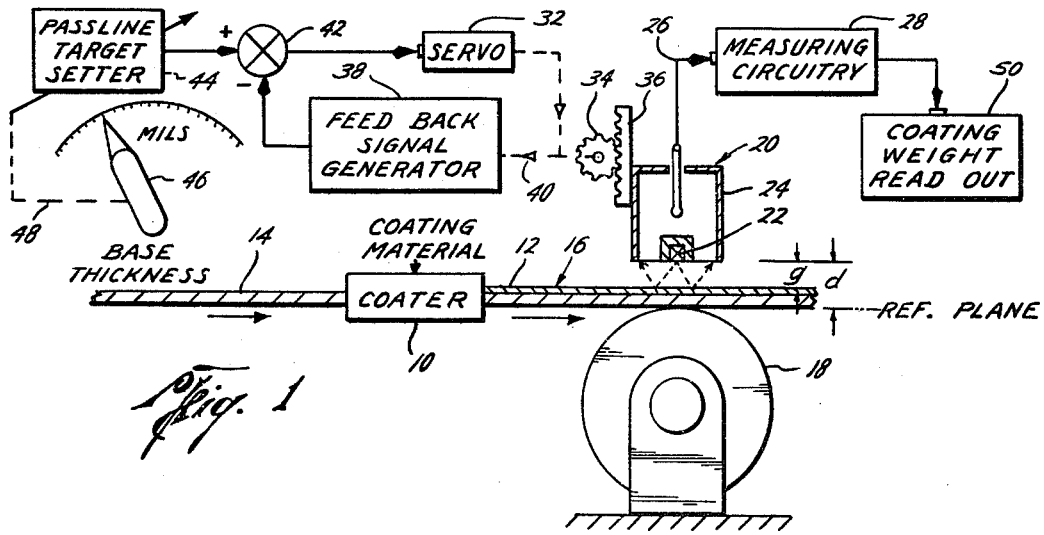
FIG. 1 is a diagrammatic view partly in section illustrating the passline adjusting mechanism of the present invention.
Figure 2:
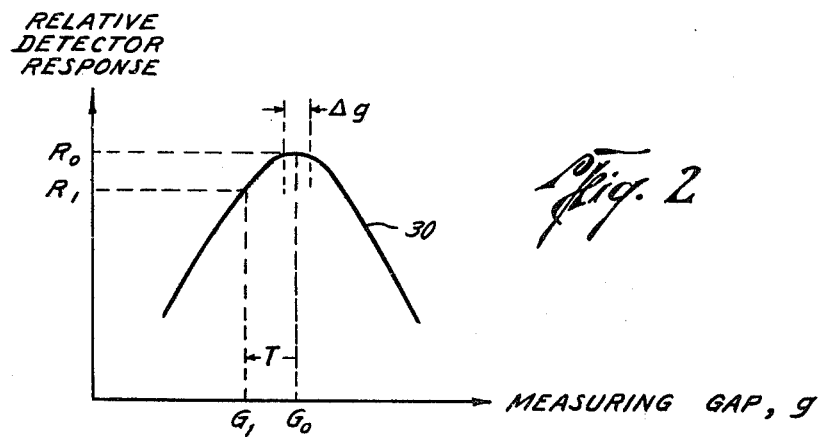
FIG. 2 is a graph of radiation backscatter detector response vs. measuring gap.

With reference to the drawing and particularly to FIGS. 1 and 2, coating unit 10 applies a thin layer of coat material 12 to a base material 14 traveling generally in the direction indicated by the small arrows. The coated sheet 16 is supported by a roll 18. The base material may be rubber, paper, plastic or metal for example, and the coating will usually be of different composition.

A radiation backscatter gauge 20 is used to measure the weight of coating 12 applied to the upper surface of the base material 14. Gauge 20 includes a source of radiation 22 mounted inside a detection chamber 24 to direct nuclear radiation such as beta particles toward the coated sheet 16.

Radiation reflected from the sheet 16 is translated into an electrical signal on line 26 coupling the detection chamber 20 to a measuring circuit 28. Other types of radioactive materials and source-detector geometry could be used. For example, the source 22 may be located outside the chamber 24 and tilted to reflect radiation off the sheet into the chamber.

Pausing to examine some of the geometry considerations involved in the construction of the present invention, the bottom of the coated sheet may serve as a reference plane since it will be against the roll 18 by virtue of gravitational or other forces such as tension, peculiar to the process being monitored. The backscatter gauge is located a distance $d$ above the reference plane. Gap $g$ is defined as the space between the bottom of the gauge 20 and the top of the coated sheet 16. If the thickness of the coating 12 is negligible compared to the thickness $t$ of the base material 14, it is apparent that the measuring gap $g$ is inversely proportional to the thickness $t$ of the base material 14 for a given gauge-to-roll spacing $d$.

As can be seen from FIG. 2 the response of the backscatter detector varies with the gap spacing $g$. A maximum response $R_o$ can be obtained from the detector when the gap $g$ is equal to an optimum value $G_o$ which might be 0.5 inch for example. The response drops off considerably on either side of the optimum gap value as illustrated by the curve 30.

Therefore, the signal developed by the backscatter chamber 24 will vary not only with coating weight but also with any dimensional changes in the geometry which alter the measuring gap. In most processes, such a dimensional change results from a change in the thickness $t$ of the base material. Very often a coating line will be used to accommodate base materials of different thickness. It is desirable to maintain the gauge-to-sheet spacing or passline at the optimum gap value $G_o$ regardless of what thickness of base material is being run. To provide this preferred spacing, I position the backscatter gauge to vary its distance $d$ from the reference plane. When a thin base is run, I reduce $d$, and when a thick base is run, I increase $d$.

Apparatus for vertically displacing the backscatter gauge is shown in FIG. 1. It is appreciated that the horizontal passline illustrated is exemplary and the required gauge displacement can be made for inclined passlines and vertical passlines as well. A servo unit 32 drives the source-detector unit 20 up and down. A pinion gear 34 and cooperating rack gear 36 fastened to the chamber is illustrative of only one way of converting the rotary drive of the servo unit 32 into linear motion of the chamber 24. If the source 22 is housed separately from the chamber 24, it is within the scope of the invention to move each housing either separately or together. Moreover, if the backscatter gauge 20 is supported by a framework to permit scanning of the coated material 16, it may be desirable to lift the entire framework relative to the reference plane by means of moving wedge members.

A feedback signal proportional to the displacement $d$ of the gauge above the reference plane is transmitted by a generator 38 mechanically coupled to the mechanical output of the servo 32 as indicated by the dotted line 40. Generator could be any form of position transducer such as a differential transformer, for example. The feedback signal is compared in a difference computing unit 42 with a target signal provided by a passline target setter 44.

The passline target setter 44 may comprise a simple resistance voltage divider network having a potentiometer with a movable tap to provide a voltage signal of selectable magnitude. An operator's control knob 46 is provided to permit operating personnel to dial in the thickness of the base material being run through the coater 10. If the knob 46 is ganged to the target setter potentiometer's movable tap as indicated by the heavy dotted line 48, any thickness from a continuous range of thickness values may be readily selected.

DESCRIPTION OF THE OPERATION

To set up the improved coating weight measuring system the base thickness selector can be set to zero and the backscatter gauge can be manually positioned above the base roll 18 until the maximum signal is obtained from the gauge 20. As a practical example, this may be 0.625" above the roll 18. The output signal from the feedback generator is set to zero.

If a sheet of known thickness T is passed over the bare roll 18, the relative detector response would decrease to the value $R_1$, (see FIG. 2) due to the diminished air gap $G_1$.

Subsequent coating weight measurements would normally be made then on a gap somewhat less than optimum. With the present invention, however, the operator moves the control knob 46 to the known base thickness T being run and the servo 32 lifts the gauge 20 a distance equal to this base thickness. At this point, the position feedback signal has increased to substantially cancel the target setter output signal.

Now, the gauge 20 and associated measuring circuitry 28 transmits a signal to the readout device 50 that is proportional only to the weight of coating 12 applied to the base material 14 by the coater 10. The signal from the gauge 20 may also be used for purposes of controlling the weight of coating 12 as described in the Varner patent, supra.

Should a change in specification call for a run on 50 mil base stock the operator selects this thickness by means of the control knob 46 and the gauge 20 lowers itself by .050" from its former position. Coating weight measurements can again be made at the optimum gap spacing where accuracy and signal-to-noise ratio are at a maximum.

While it is understood that the gap $g$ is defined as the spacing between the gauge and the upper surface of the coated material, the thickness of the coating 12 will, in most cases, be small enough relative to the thick base material, that it can for all practical purposes be neglected. The incremental gap reduction $\Delta g$ resulting from changes in coating thickness usually will not move the operating point far enough down the curve 30 to affect the accuracy of coating weight measurement.

The gap spacing can then be mathematically approximated as $$g \cong d - t_{\text{base}}$$

In those applications where the coating is sufficiently thick to reduce the passline and cause an unacceptable error, it may be necessary to incorporate a vernier control that would provide a fine increase of the passline target set on unit 44.

AUTOMATIC PASSLINE ADJUSTERS

While the passline adjuster shown in FIG. 1 is quite satisfactory for most coating lines, it requires an operator to present the thickness of the base material. Should the base thickness change at the end of a run and the operator forget to change the passline target, the subsequent coating weight measurements are made with a somewhat reduced accuracy. Even during a given specification run, the thickness may change. For example, there may be a general taper to the base thickness, causing an increase in the strip thickness from the start of the run to the finish.

Figure 3:
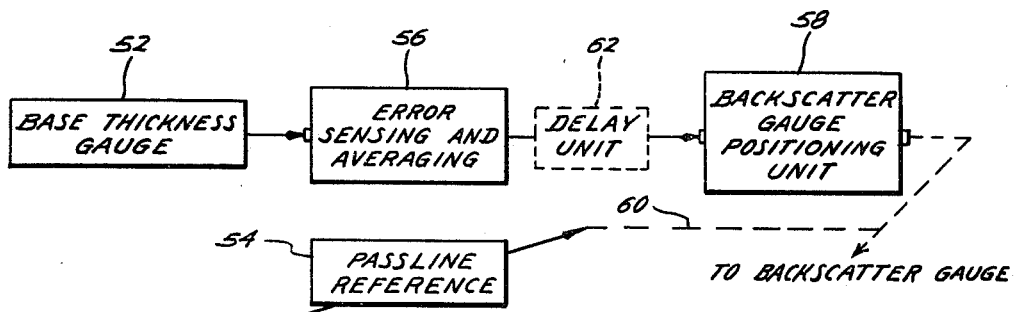
FIG. 3 is a diagrammatic view of an automatic passline adjuster.

Referring to FIG. 3, to eliminate the need of an operator, I provide a gauge 52 that monitors the sheet and generates a signal indicative of the base thickness thereof.

This function can be provided by a transducer such as a differential transformer having a movable core riding on the base sheet 14. Alternatively, it may be desirable to sense the total coated sheet thickness with a caliper transducer and use this signal for position control. This could be a linear potentiometer actuated by an arm riding on the sheet. In either case a signal is generated which is primarily a function of the base thickness of the sheet. An adjustable passline reference unit 54 provides another signal indicative of the vertical position of the gauge 20. An error sensor and averaging unit 56 generates a signal whenever the difference between the measured base thickness and the passline reference indicates a measuring gap beyond the limits of acceptable accuracy. As a representative example, a gap ±30 mils from optimum may be tolerated on a typical line. Averaging circuitry may be incorporated in unit 56 to prevent response to short term excursions of the base material thickness on which position control is not necessary; however, if averaging is employed, an error signal represents an excessive error on-time, and the backscatter gauge positioning unit 58 is actuated to move the gauge to the optimum gap spacing. Of course, the new position of the backscatter gauge is transmitted to the passline reference unit 54 as indicated by the dotted line 60 to reset the error sensing circuit 56 to the corrected passline reference value.

If the thickness gauge 52 must be physically located far from the backscatter gauge, it may be necessary, in some cases, to delay adjustment of the passline until the change in base thickness reaches the backscatter gauge location. A delay unit 62 shown in dotted outline may be used to delay position control for a period of time inversely proportional to the speed of the material. A transportation lag timer such as described in the Varner patent, supra may be used to provide this function.

ZINC PLATING SYSTEM

An automatic passline adjust system for a zinc coating process is illustrated in FIG. 4. In this system, a steel strip 64 enters a dip coater 66 to receive a zinc coating on both sides or surfaces thereof. The coated strip 68 is trained around a roll group including a pair of bridle rolls 70 and 72. A pair of backscatter gauges 74 and 76 are employed to measure the weight of coating deposited on each side of the base strip 64. A passline adjust mechanism can be used on each gauge to adjust simultaneously their individual passlines. To avoid repetition, only the adjuster mechanism for the gauge 76 is shown in detail.

To eliminate contact with the strip, I have found it preferable to measure the thickness of the base strip 64 with a radiation transmission gauge 80 comprising a radiation source S and a detector D located on opposite sides of the strip 64. The detector D generates a signal inversely proportional to the strip thickness due to absorption of radiation by the strip 64. The detector D is coupled to a measuring servo 82 which translates the measured base thickness into mechanical movement transmitted by a linkage indicated by the dotted line 84. For a more detailed construction of the preferred measuring system, reference may be had to U.S. Patent 2,790,945 issued to H. R. Chope and assigned to the same assignee as the present invention. The measuring servo 82 may drive a pen 86 of a recorder 88 to indicate the changes in base thickness of the entering strip 64.

A difference computing bridge circuit 90 is employed to detect changes in gap spacing resulting from a shift in measured base thickness. A passline servo 92 monitors the output of bridge 90 and positions the gauge head 76 to maintain the bridge at balance. The bridge 90, in simplified form, comprises a repeat slidewire potentiometer 94 mechanically coupled to the base thickness measuring servo 82, a passline reference potentiometer 96, and a voltage source represented by the battery 98. The thickness and passline potentiometer have movable taps 94a and 96a, respectively, connected to the input of passline servo 92.

The position of these taps along their respective slidewires can be calibrated in units of displacement such as mils. For example, the passline potentiometer may have a range of 140 mils (0.140″), with the bottom end corresponding to zero. This point on the passline potentiometer is aligned in the drawing at a distance above the roll 72 equal to the optimum gap $G_o$, since this provides one convenient point of reference. The range of displacement of the passline potentiometer 96 is selected to accommodate the total range in base thickness values expected.

The passline servo 92 drives both the raising pinion 100 through a pair of closed electromechanical clutch contacts 102 and the tap 96a of the passline potentiometer 96 in response to any potential difference between the potentiometer taps 94a and 96A. The tap 96a follows the vertical displacement of the bottom surface of the gauge 76.

OPERATION OF ZINC PLATING EMBODIMENT

To set up the passline adjust system described above, the operator depresses a switch 104 to energize an initial set up circuit 106. Set up circuit 106 includes relays and a suitable source of power to disconnect the clutch contacts 102 and uncouple the gauge 76 from the automatic passline adjuster. At the same time, another pair of clutch contacts 108 are closed to permit the head to be manually positioned over the bare roll 72 until a maximum gauge response is indicated on the coating weight recorder 110 connected to the backscatter gauge 76. When this point of maximum response is found, the passline potentiometer tap 96a is moved to the zero end of its travel. The set up switch 104 is released to disconnect the gauge 76 from the manual adjust unit 112 and to connect it to the automatic passline adjuster.

If a strip 64 of, say, .050″ is threaded into the system, gauge 80 detects this base thickness value. Measuring servo 82 indicates this thickness value on the chart recorder 88 and moves the slidewire tap 94a to a position on potentiometer 94 corresponding to the measured base thickness. The bridge 90 is unbalanced and a voltage prevails between the potentiometer taps 94a and 96a that energizes the passline servo 92. Pinion gear 100 is rotated counterclockwise to raise the gauge 76. Tap 96a is carried upwardly with the gauge 76 until its potential is substantially equal to that prevailing on the base thickness slidewire tap 94a. At this point, the passline servo 72 stops leaving the gauge 0.050″ higher than it was when there was no strip in the gap. Since the gauge was located at the optimum gap and it moved upwardly a distance substantially equal to the strip thickness, the optimum gap spacing $G_o$ is preserved.

It can be seen that no matter what the base thickness is, it is measured and used to raise and lower the gauge 76 to maintain the optimum gap $G_o$ by means of my continuous passline adjuster. It is within the scope of this invention to provide range switching and make other modifications of the bridge 90 to improve the calibration accuracy of my gauge positioning system.

Another method of raising the backscatter gauge is illustrated in FIG. 5. A carriage 112 housing the backscatter source and detector travels on an overhead traversing guide tube 114. A coated sheet 116 is supported by a roll member 118. The guide tube 114 is mounted in a pair of upstanding end members 120 and 122, one located at either edge of the sheet 116. A motor 124 may be coupled to the source-detector carriage 112 to cause it to traverse or scan back-and-fourth across the sheet. In simplified illustration, each end member is supported by a movable wedge W positioned between the end members 120 and 122 and a fixed supporting base 126. The wedges W may be threaded onto a lead screw 128 rotated by a servomotor 130. Each wedge W may be controlled simultaneously by the motor 130 as indicated by the dotted line 132.

The entire gauge assembly may be displaced upwardly by driving the wedges W toward the sheet 116. Counter-rotation of the lead screw 128 serves to lower the assembly. A similar arrangement can be built for use on a vertical passline wherein the backscatter gauge must be displaced horizontally.

Another feature that may be provided is that of weld protection. Usually, the end of one strip is welded to the beginning of another to provide a continuous coating process. The weld W is a local region of increased thickness that may damage the face of the backscatter gauge 112 when it passes by. Mechanical devices have been used to contact the entering strip 134 and detect the weld W. I have found it more suitable to use a non-contacting radiation gauge 138 upstream from the backscatter 112 to detect the weld W and to move the gauge away from the coated sheet 116. The gauge 112 may be lifted by the wedges W or laterally withdrawn to the dotted line position 112a.

One way to provide this function, is to interdict the normal back-and-forth gauge scanning command of a scanning programmer 140. A thickness limit circuit monitors the base thickness signal provided by the base thickness measuring and recording system 142 coupled to the radiation gauge 138. A limit switch 144 for example, may be actuated by the base thickness recording pen when a thickness much larger than usually provided by the normal variations in base thickness is detected by the radiation gauge 138. Actuation of limit switch 144 causes an automatic gauge withdrawal unit 146 to alter the normal program of the scanning programmer 140 for a predetermined length of time, sufficient to allow the weld W to pass the downstream backscatter gauge 112. For this purpose, the offsheet withdrawal unit 146 may incorporate a dwell timer well known to those skilled in the art.

The passline adjuster 148 also may be coupled to the output of the base thickness measuring system 142 to effect the desired gap spacing after the weld W has passed the backscatter gauge 112. The passline adjuster controls the operation of servomotor 130 in the manner described above.

Other embodiments of the present invention are possible. For example, a base thickness gauge can be used to monitor the thickness of fibrous substrate on which is deposited a coating of plastic. A backscatter gauge, mounted adjacent to the coated substrate for measuring the weight of thickness of the plastic coating, may be positioned relative to the surface of the substrate to improve the accuracy of the coating measurement.

SUMMARY

My invention provides for the ultimate in backscatter gauging accuracy in measuring coating weight. It not only corrects the coating measurement for changes in the base thickness but it also establishes and maintains the gauge-to-material spacing at the optimum value. Moreover, a completely automatic coating weight gauging system is provided for a metal coating process. It is noted that other types of gauging means may be used for obtaining coating measurements.

Although certain specific embodiments of the invention have been shown and described herein, many modifications may be made thereto without departing from the true spirit and scope of the invention as set forth in the appended claims.

I claim:
1. Method of improving the response of a radiation backscatter gauge located adjacent to one surface of a base material to measure the weight of coating applied thereto, said method comprising the steps of:
   measuring the thickness of said base material, and
   positioning said backscatter gauge toward or away from said coated surface in accordance with said measured base thickness to maintain the spacing between said gauge and said surface of said base substantially constant.

2. The method of improving the response of a radiation backscatter gauge for measuring the weight of coating applied to one surface of a base material, said method comprising the steps of:
   positioning said gauge over a support surface,
   adjusting the spacing of said gauge from said support surface to maximize the response of said gauge,
   measuring the thickness of said base material,
   passing said coated base material across said support surface, increasing the spacing of said gauge relative to said support surface in accordance with measured base thickness to maintain the spacing between said gauge and the surface of said base material substantially at said maximum response value.

3. Apparatus for measuring the weight of a coat material deposited on one surface of a base material independently of changes in the thickness of said base material comprising:
   a radiation backscatter gauge positioned adjacent to said coated surface of said base material to provide a first signal proportional to the weight of said coating,
   means for generating a second signal proportional to the thickness of said base material, and
   means responsive to said second signal for changing the position of said backscatter gauge relative to the surface of said coated material to maintain the spacing between said gauge and said coated surface substantially constant.

4. Apparatus for measuring the weight of a coat material deposited on a base material independently of changes in the thickness of said base material comprising:
   a radiation backscatter gauge positioned adjacent to one surface of said coated base material and movable toward or away therefrom to provide a first signal indicative of the weight of said deposited coat material,
   adjustable means for varying the spacing between said gauge and said coated material,
   a gauge positioned adjacent to said uncoated base material for providing a second signal indicative of the thickness of said base material, and
   means responsive to said second signal for actuating said adjustable means to maintain a preferred backscatter gauge spacing relative to said surface of said base material regardless of changes in the thickness of said base material.

5. Apparatus as set forth in claim 4 further including means responsive to said second signal for automatically withdrawing said backscatter gauge from said coated material whenever said base thickness increases above a predetermined value.

6. Apparatus for measuring the thickness of a coat material deposited on one surface of a traveling base material of changing thickness comprising:
   first gauge means positioned adjacent to said coated material surface to provide a signal proportioned to the thickness of said coat material and to the spacing of said gauge means from said surface,
   second gauge means for measuring the thickness of said uncoated base material,
   means responsive to said measured thickness of said uncoated base material for varying said spacing of said first gauge means from said coated surface to compensate for changes in passline due to changes in the thickness of said base material.

7. Apparatus for eliminating the measurement error in a radiation backscatter gauge positioned adjacent to one surface of a base material having a coat material deposited on said surface by a coating unit, said backscatter gauge providing a signal proportional to the weight per unit area of said coat material, said apparatus comprising:
   a radiation transmission gauge mounted adjacent to said coating unit to provide a signal proportional to the thickness of said uncoated base material,
   adjustable means for varying the spacing between said backscatter gauge and said surface of said coated base material to establish an optimum gap spacing,
   means providing a feedback signal proportional to the deviation of said gauge spacing from said established optimum gap spacing, error sensing means receiving said thickness signal and said feedback signal for generating a control signal whenever said base thickness exceeds said deviation in gauge spacing from said established optimum gap value, means responsive to said control signal for actuating said adjustable means to maintain said spacing substantially constant regardless of changes in the thickness of said base material, and means for delaying said actuation in accordance with the transportation time of said base material from said first gauge to said backscatter gauge.

8. Apparatus for eliminating errors due to changes in the passline of a radiation backscatter gauge positioned adjacent to one surface of a base material having a coating material deposited on said surface, said apparatus comprising:

means for generating a signal proportional to the thickness of said base material, means for providing a feedback signal proportional to the distance of said gauge from the opposite surface of said sheet, means for comparing said base thickness signal with said feedback signal to provide an error signal whenever said signals differ in magnitude by more than a predetermined amount, and means responsive to said error signal for altering the distance of said gauge from said opposite surface to maintain the spacing between said gauge and said surface of said base material substantially constant.

9. Apparatus substantially as set forth in claim 8 in which said base thickness signal generating means comprises:

a potentiometer having an adjustable tap, a source of electrical potential connected across said potentiometer, and operator control means coupled to said adjustable tap to permit selection of any desired base thickness from a continuous range of values therefor.

10. Apparatus substantially as set forth in claim 8 in which said non-contacting gauge comprises:

a radiation transmission gauge mounted adjacent to said uncoated material.

11. Apparatus for protecting a backscatter gauge mounted adjacent to a coated sheet from damage due to welds in the base material, comprising:

a radiation gauge for measuring the thickness of said base material, and means responsive to said base thickness measurement for removing said backscatter gauge from said coated sheet.

12. Apparatus for protecting a backscatter gauge mounted adjacent to a coated sheet from damage due to welds in the base material, comprising:

a radiation gauge means for providing a signal proportional to the thickness of said base material, and means responsive to said thickness signal for actuating withdrawal of said backscatter gauge from said coated sheet when said base thickness exceeds a predetermined limit corresponding to a weld in said base material.

13. Apparatus as in claim 12 in which said radiation gauge means includes means for automatically adjusting the passline of said backscatter gauge in response to said thickness signal to maintain a preferred spacing relative to said coated sheet regardless of changes in the thickness of said base material.

14. Apparatus for protecting a backscatter gauge mounted adjacent to a coated material from damage to regions of increased thickness, comprising:

radiation gauge means for measuring the thickness of said base material, and means responsive to said thickness measurement for removing said backscatter gauge from said coated material when said base material thickness exceeds a predetermined limit.

15. Apparatus for protecting a backscatter gauge mounted adjacent to a coated sheet from damage due to regions of increased thickness, comprising:

radiation gauge means for providing a signal proportional to the thickness of base sheet, and means responsive to said signal for actuating withdrawal of said backscatter gauge from said coated sheet when said base sheet thickness exceeds a predetermined limit corresponding to a region of increased thickness.

16. Apparatus for measuring the weight of a coat material deposited on one surface of a base material independently of changes in the thickness of said base material comprising:

gauge means positioned adjacent to said coated material surface to provide a signal proportional to the weight of said coat material, means for generating a second signal proportional to the thickness of said base material, and means responsive to said second signal for changing the position of said gauge relative to the surface of said coated material.

17. Apparatus for measuring the weight of a coat material deposited on one surface of a base material independently of changes in the thickness of said base material comprising:

gauge means positioned adjacent to said coated material surface to provide a signal proportional to the weight of said coat material, means for generating a second signal proportional to the thickness of said base material, and means responsive to said second signal for changing the position of said gauge relative to the surface of said coated material to maintain the spacing between said gauge and said coated surface substantially constant.

18. Apparatus for measuring the weight of a coat material deposited on one surface of a base material independently of changes in the thickness of said base material comprising:

gauge means positioned adjacent to said coated material surface to provide a signal proportional to the weight of said coat material, means for generating a second signal proportional to the thickness of said base material, and means responsive to said second signal for changing the position of said gauge relative to the surface of said coated material for removing said gauge means from said coated material.

References Cited
UNITED STATES PATENTS

| | | | |
|---|---|---|---|
| 2,800,591 | 7/1957 | Gilman | 250—83.3 |
| 3,001,073 | 9/1961 | Alexander et al. | 250—83.3 |
| 3,190,261 | 6/1965 | Ziffer | 118—8 |

RALPH G. NILSON, Primary Examiner

A. B. CROFT, Assistant Examiner

U.S. Cl. X.R.

250—43.5, 83.6